Jan. 1, 1957 B. PICKUP 2,775,888
DEVICE FOR MEASURING TACKINESS
Filed Oct. 19, 1954 2 Sheets-Sheet 1
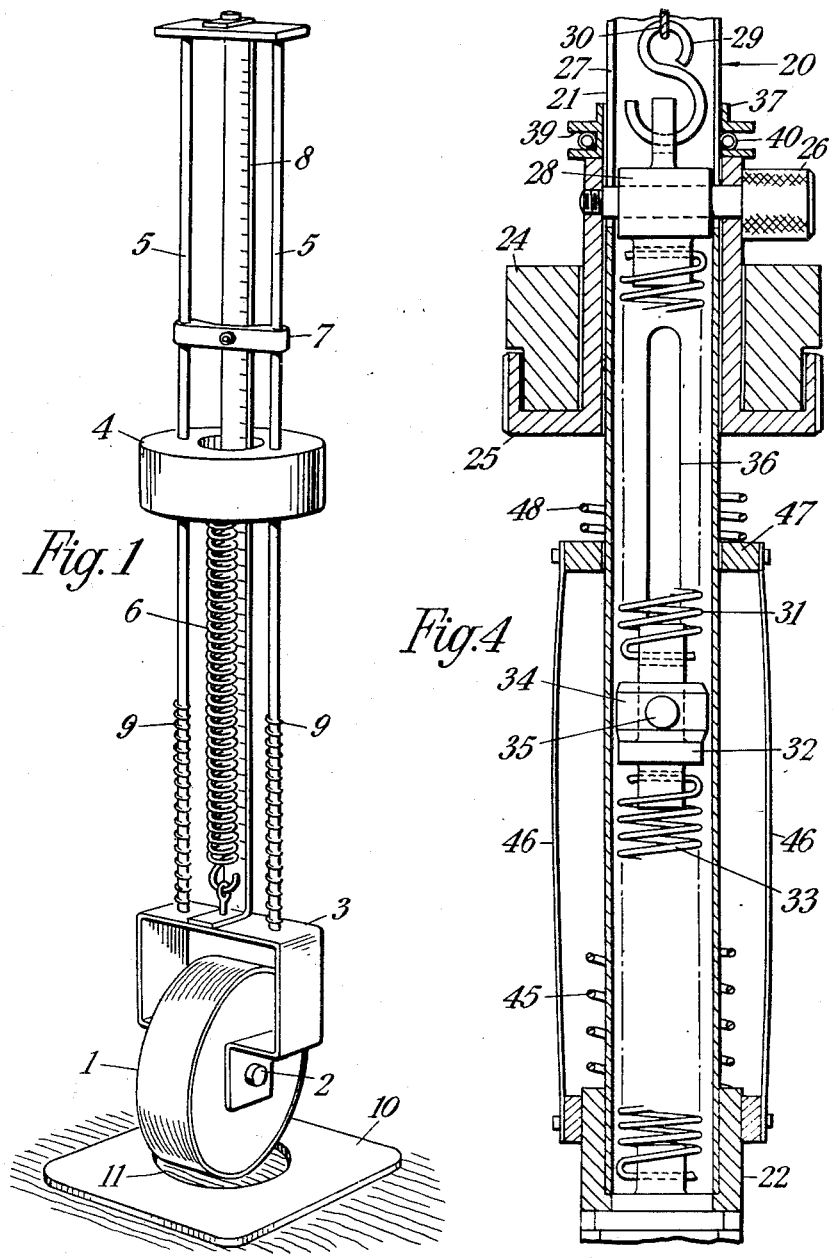
INVENTOR
Bryan Pickup
by Benj. T. Rauber
his attorney Jan. 1, 1957  B. PICKUP  2,775,888
DEVICE FOR MEASURING TACKINESS
Filed Oct. 19, 1954  2 Sheets-Sheet 2
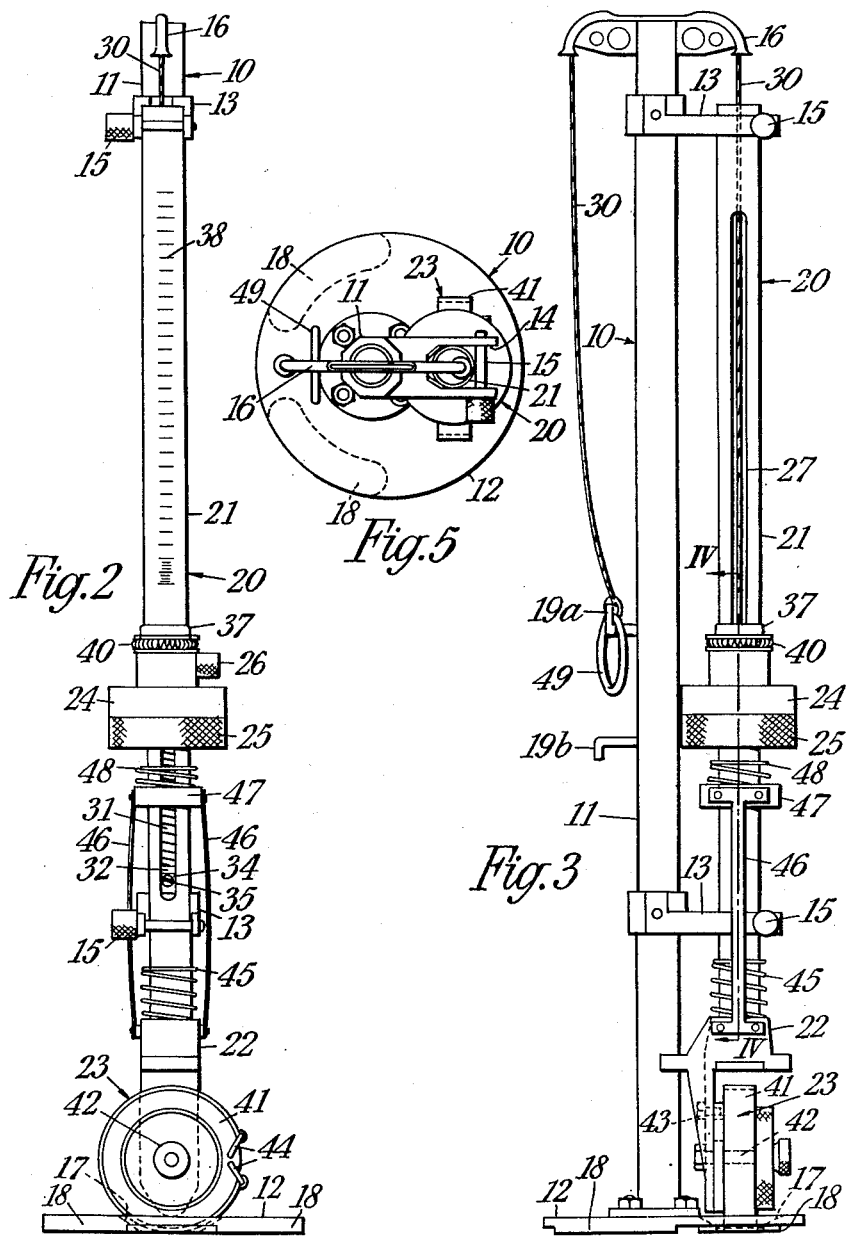
INVENTOR
Bryan Pickup
by Benj. T. Pauber
his attorney

United States Patent Office 2,775,888
Patented Jan. 1, 1957

2,775,888

DEVICE FOR MEASURING TACKINESS

Bryan Pickup, Sutton Coldfield, England, assignor to Dunlop Rubber Company Limited, London County, England, a British company Application October 19, 1954, Serial No. 463,232

Claims priority, application Great Britain October 30, 1953

10 Claims. (Cl. 73—150)

This invention relates to a device for measuring the tackiness of a surface of a sheet of material, particularly sheet rubber or rubberised fabric.

The tackiness of a surface can be measured by the force required to separate two parts of that surface which have been pressed together. My force depends upon the degree of tackiness, the area of contact, the load, applied to the surface and the time of application of the load.

The tackiness is also modified if the surface is contaminated or bloomed. As this effect occurs erratically over the surface of a sheet of rubber, measurements must be made at many places to obtain a good estimate of the average tackiness of the sheet.

A known device for measuring tackiness consists essentially of two holders to which small portions of the surface are attached, a loading device to press the surfaces together, and a load-measuring device to record the force required to separate the surfaces. If several small areas have to be cut from the material the test is prolonged and the material damaged and such a test is unsuitable for routine factory use.

My invention provides a device which will enable a series of measurements to be made over the surface of a whole sheet of material without damaging the surface.

According to my invention a device for measuring the tackiness of a surface of material comprises a holder for a portion of the material, a weight freely slidable along a guide secured to the holder and connected to the holder by at least one spring, and an indicator indicating the deflection of the spring when the weight is slid along the guide away from the holder.

Preferably the holder comprises a cylinder adapted to carry a strip of material on its cylindrical surface and rotatably mounted on a bracket to which the guide is attached.

As a cylinder is the limiting form of a polygonal prism with an infinite number of faces parallel to the axis of symmetry, it will be understood that any body having at least one surface parallel to the axis may be used as a holder.

In one construction, the guide is formed by two parallel rods, and the indicator comprises a linear scale disposed longitudinally between the rods and a rider slidable on the rods so that it may be moved along the scale by movement of the weight to indicate the maximum deflection of a single tension spring secured at its ends to the bracket and the weight.

In an alternative construction, the guide is formed by a hollow tube engraved on its outer surface with a linear scale. Two tension springs in series are located within the tube and are connected between the bracket and an anchorage within the tube attached to the weight through a longitudinal slot in the tube wall. A stand is provided comprising a base plate and a vertical pillar carrying guides in which the tube is freely slidable and which are adapted for insertion or removal of the tube. An aperture is cut in the baseplate in alignment with the holder whereby a portion of material secured to the holder may be brought into contact with the surface of the material on which the stand is placed.

The invention will now be more particularly described with reference to the accompanying drawings wherein:

Figure 1 shows a perspective view of one embodiment of the device,

Figure 2 shows a front elevation of a second embodiment,

Figure 3 shows a side elevation thereof,

Figure 4 shows an enlarged part-section on the line IV—IV in Figure 3, and

Figure 5 shows a plan view of the second embodiment.

As shown in Figure 1, a light alloy metal cylinder 1 is rotatably mounted on a tightly fitting axle 2 in a metal bracket 3. A weight 4 slides freely on two parallel guide rods 5 attached to the bracket 3 and is itself connected to the bracket 3 by a coiled tension spring 6 so that as the weight 4 is raised on the rods 5 relative to the bracket 3 the spring 6 is extended and an increasing upward force is applied to the bracket.

A rider 7 is slidably mounted on the guide rods 5 with sufficient friction therebetween to prevent movement of the rider 7 due to its own weight and as the spring 6 is extended the rider 7 is pushed up the guide rods 5 by the weight 4 and the extension of the spring 6 can be read from the position of the rider 7 on a scale 8 disposed longitudinally between the guide rods 5. A short compression spring 9 is located on each guide rod 5 between the bracket 3 and the weight 4. These springs 9 act as buffers to prevent damage to the device when the bracket 3 moves towards the weight 4 under the influence of the spring 6 when the device is in use as will be described.

To measure the tackiness of the surface of a sheet of material a strip is removed from a convenient place in the material and is fitted round the circumference of the cylinder 1 with the surface under investigation outwards. To ensure accuracy, care should be taken that the surface of the strip is not contaminated by contact with fingers or other objects. A plate 10 having a hole 11 through it is placed on the parent surface so that the area to be examined is accessible through the hole 11 and the device is placed vertically on the material with the strip attached to the cylinder 1 in contact with the area within the hole 11 in the plate 10. The device is held in the operator's hand so that no vertical force other than the total weight of the device is applied to the contacting surfaces.

After a predetermined period, e. g. 10 seconds, the weight 4 is raised up the guide rods 5 slowly by hand, the apertured plate 10 being held down to prevent the sheet of material lifting. When the tension of the spring 6 exceeds the adhesive force between the strip and the parent surface added to the total weight of the device, less the sliding weight, the surfaces separate and the spring 6 recoils, the guide rods 5, bracket 3, and cylinder 1 being carried upwards until the buffer springs 9 contact the slidable weight 4. The maximum force exerted by the spring can be read from the position of the rider 7 on the scale 8. If desired the scale 8 may be calibrated to give a direct indication of the tackiness values.

The cylinder 1 is then rotated so that a fresh part of the strip can be exposed to the parent surface and the tackiness at another point in the parent surface evaluated.

When rubberised fabric is to be tested, the strip is cut so that the direction of the cords is along the strip and round the cylinder. This ensures that the strip will not easily be deformed during testing. The device must be placed on the parent surface so that the directions of the cords in the strip and parent surface are at right angles; otherwise the contact area is indefinite.

Thin rubber sheet can be tested if it is backed with rubberised fabric to prevent it from being distorted. If thicker sheets are tested, care must be taken to ensure that the surface of the strip does not become concave due to its being bent into a circular form.

To increase the range of tackiness values which the instrument can measure, a stronger or weaker spring can be substituted for the one fitted. The spring may also be a compression spring mounted between the sliding weight and an anchor at the top of the guide rods.

In the second embodiment shown in Figures 2 to 5, the instrument generally comprises a device 20 and a stand 10. The device 20 comprises a vertical guide tube 21 connected at its bottom end to an inverted L-shaped bracket 22 which carries a holder 23 shortly to be described. A weight 24 is located in a cup-shaped carrier 25 freely slidable along the tube 21. The weight 24 is in two halves and may be removed and replaced by a larger or smaller size as required. A pin 26 screwed into the carrier passes through two diametrically opposite longitudinal slots 27 in the tube 21 and carries an anchor 28 located within the bore of the tube 21. A hook 29 on one end of a draw string 30 which extends upwardly through the tube 21 is attached to the anchor 28 above the pin 26. Below the pin 26 an extension spring 31 is secured to the anchor 28 and extends downwardly through the tube 21 and is connected at its lower end to a connector block 32. The block 32 is also secured to a second extension spring 33 within the tube 21 the other end of which is secured to the bracket 22 at the bottom end of the tube 21. The block 32 carries a collar 34 from which protrudes a pin 35. The pin 35 extends outwardly through a slot 36 formed longitudinally part way along the tube 21. As the weight 24 is moved upwardly with respect to the tube 21 the springs 31, 33 extend together and the block 32 also moves upwardly until the pin 35 engages the upper end of the slot 36. At this point further extension of the spring 33 is prevented and the effective rate of the spring connection between the weight 24 and the bracket 22 is altered.

The extension of the springs 31, 33 and consequently the tensile force exerted thereby, is measured by a rider 37 slidable on the outside of the tube 21 and a scale 38 engraved on the surface of the tube 21. The rider 37 is provided with a circumferential groove 39 in which is located a garter spring 40 which is in contact with the tube 21 through the agency of holes cut in the bed of the groove 39 and which serves to maintain the rider in any position on the tube 21. As the weight 24 is moved up the tube 21 the rider 37 is pushed before it and will remain at rest relative to the tube 21 after the springs have retracted during the operation of the device as will shortly be described. The scale 38 is marked off in measurement of force and the upper end of it is compressed relative to the lower end in accordance with the differential spring rate obtained by virtue of the block 32 and pin 35 arrangement described above.

The holder 23 for a specimen strip of the material to be investigated comprises a circular drum 41 rotatably mounted on an overhanging pivot 42 attached to the bracket 22. The drum is urged axially toward the bracket by a coil compression spring (not shown). A stud 43 on the bracket is engageable with sixteen circular depressions on the end surface of the drum and serves to positively locate the drum in each of sixteen positions. Clips 44 are provided on the drum to secure the specimen strip on the peripheral surface thereof.

A recoil spring 45 is loosely located about the tube 21 above the bracket 22. Extending upwardly from the bracket 22, on each side of the tube, is a leaf spring 46. The upper ends of the springs 46 are secured to a loose collar 47 on the tube 21. A further loose coil spring 48 is located about the tube 21 above the collar.

The stand 10 comprises a pillar 11 mounted on a base plate 12 and carries two guides 13 having U-shaped slots 14 in which the tube 21 is freely slidable and closable by removable pins 15. The top of the pillar 11 carries a conduit 16 for the string 30 described above. The base plate 12 is provided with an aperture 17 immediately beneath the position taken up by the holder 23 when the device 20 is mounted in the stand 10. The base plate is also provided with three arcuately shaped feet 18 arranged adjacent its periphery. Mounted on the back of the pillar 11 are two hooks 19a, 19b. The upper hook 19a serves as a convenient rest for a ring 49 attached to the free end of the string 30. The lower hook 19b is so positioned that when the device is mounted in the stand and the ring 49 engaged with the hook, the device 20 and consequently the holder 23 is lifted clear of the base plate and a specimen strip can be conveniently mounted on the drum 41.

In operation the device 20 is located vertically in the guides 13 of the stand 10 and the pins 15 inserted as shown in Figure 3. The ring 49 is engaged with the hook 19b to raise the device 20 and a strip taken from the material to be tested, prepared as described with reference to the first embodiment, is secured to the drum 41 by the clips 44. The stand is then placed on the surface of the material and the ring 49 disengaged from the hook 19b allowing the device to descend in the guides 13 until the strip on the drum 41 contacts the surface of the material through the aperture 17. After a predetermined interval of time e. g. 10 seconds the string 30 is pulled through the conduit 16 thus raising the weight 24 in its carrier 25. The tackiness of the material causes the strip to adhere to the surface and the springs 31, 33 stretch so that the weight 24 slides up the guide tube 27 pushing the rider 37 before it along the scale 38. When adhesion breaks down, the springs 31, 33 re-assert themselves and the guide tube 21 carrying the bracket 22 and the holder 23 slide upwardly in the guides 13 until the spring 45 contacts the lower of the guides 13 and stops any further upward movement without shock. The position of the rider 37 on the scale 38 indicates the degree of tackiness of the surface of the material at the point tested.

Further tests are made at other points on the surface of the material, the drum 41 being revolved until the stud 43 engages a further depression in the end surface of the drum for each test and a fresh portion of the test strip being thereby presented to the material surface.

In order to obtain the most precise test conditions the device is preferably operated in the stand, but the device 20 may also be operated out of the stand by first disengaging the hook 29 from the anchor 28 and removing the pins 15 to release the device. The device is then held vertically with the operator's fingers touching the weight 24 only and after the period of contact of the test strip mounted on the drum 41 as before with the material the weight is lifted upwards. The material under test is conveniently held down by an apertured plate as described with reference to the first embodiment. The rider is again moved up the scale 38 as the springs 31, 33 are stretched and when adhesion breaks down the upward movement of the guide tube 21, the bracket 22 and the holder 23 is controlled by contact of the spring 48 with the underside of the carrier 25, shock being absorbed by the springs 48 and 46.

Having now described my invention, what I claim is:

1. A device for measuring the tackiness of a surface of material comprising a holder for a specimen of the material, a guide secured to said holder, a weight freely slidable along said guide, at least one spring connecting said holder to said weight and an indicator movable along said guide by contact with said weight and having a frictional contact with said guide to maintain its position thereon when not moved by said weight or other moving force, thereby to indicate the deflection of the spring when the weight is moved along the guide away from the holder.

2. A device according to claim 1 wherein the holder comprises a bracket secured to the guide and a cylinder adapted to carry a strip of the material on its cylindrical surface and rotatably mounted on said bracket.

3. A device according to claim 1 wherein the holder comprises a bracket secured to the guide and a specimen holder rotatably mounted on the bracket to which the guide is attached and having at least one surface parallel to its axis of rotation adapted to carry a strip of the material.

4. A device according to claim 1, wherein the guide is provided with a scale and the indicator comprises a rider movable along the guide relative to said scale by movement of the weight and frictionally held relative to the guide when movement of the weight ceases.

5. A device according to claim 1 wherein the guide comprises two parallel rods and the weight is connected to the holder by a single tension spring.

6. A device according to claim 1 wherein the guide comprises a cylindrical tube and wherein the device is provided with a carrier on which the weight is mounted and which is freely slidable along the tube and connected to the holder by two tension springs in series located within the tube.

7. A device according to claim 6, a block between and connecting the springs to each other and carrying a pin which is slidable within a slot in the wall of the tube whereby further extension of one spring is prevented when extension of both springs brings the pin into contact with one end of the slot.

8. A device according to claim 6 having a stand slidably holding said guide in vertical position, said stand comprising a base plate, a vertical pillar, two guides mounted in vertically spaced positions on said pillar to releasably hold the tube in vertical freely slidable relationship.

9. A device according to claim 8 wherein the base plate extends beneath the holder and is provided with an aperture below the holder whereby the circumference thereof may contact a surface below the base plate.

10. A device according to claim 8 comprising a draw string releasably attached to the carrier and extending upwardly through the bore of the tube and through a conduit on the stand.

References Cited in the file of this patent
UNITED STATES PATENTS

| | | |
|---|---|---|
| 280,491 | MacKay | July 3, 1883 |
| 2,051,464 | Bradner | Aug. 18, 1936 |
| 2,330,342 | Fossati | Sept. 28, 1943 |
| 2,473,517 | Freedman | June 21, 1949 |